United States Patent
Lo et al.

(10) Patent No.: US 9,234,493 B2
(45) Date of Patent: Jan. 12, 2016

(54) WAVE POWER GENERATION SYSTEM AND HYDRAULIC COMPONENT THEREOF

(71) Applicant: INDUSTRIAL TECHNOLOGY RESEARCH INSTITUTE, Hsinchu (TW)

(72) Inventors: Sheng-Chung Lo, Hsinchu (TW); Chen-Yang Lan, Hsinchu (TW); Wei-Ming Chen, Zhubei (TW); Tzu-Hung Huang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 280 days.

(21) Appl. No.: 14/055,605

(22) Filed: Oct. 16, 2013

(65) Prior Publication Data

US 2014/0116042 A1    May 1, 2014

(30) Foreign Application Priority Data

Oct. 31, 2012    (TW) .............................. 101140419 A (51) Int. Cl.
*F03B 13/20*    (2006.01)
*F03B 13/16*    (2006.01)
(Continued)

(52) U.S. Cl.
CPC ............. *F03B 13/16* (2013.01); *F03B 13/1875* (2013.01); *F05B 2260/64* (2013.01); *F15B 21/044* (2013.01); *Y02E 10/38* (2013.01)

(58) Field of Classification Search
CPC .. F03B 13/16; F03B 13/1875; F03B 13/1855; F05B 2260/64; Y02E 10/38

USPC ................... 60/495–504; 290/42, 43, 53, 54
See application file for complete search history.

(56) References Cited

U.S. PATENT DOCUMENTS

| | | |
|---|---|---|
| 4,009,395 A | 2/1977 | Long et al. |
| 5,346,436 A | 9/1994 | Hunter et al. |

(Continued)

FOREIGN PATENT DOCUMENTS

| | | |
|---|---|---|
| CN | 102506005 A | 6/2012 |
| CN | 102597494 A | 7/2012 |

(Continued)

OTHER PUBLICATIONS

Office Action From TIPO Dated Jan. 26, 2015.
(Continued)

*Primary Examiner* — Jesse Bogue
*Assistant Examiner* — Kelsey Stanek
(74) *Attorney, Agent, or Firm* — Locke Lord LLP; Tim Tingkang Xia, Esq.

(57) ABSTRACT

A wave power generation system includes a power generation component and a hydraulic component. The hydraulic component includes a cylinder and a piston. The cylinder connects to the power generation component. The cylinder has an accommodation space and a vent located in the middle section of the accommodation space such that the vent runs outside from the accommodation space. The accommodation space is used for accommodating a fluid. The piston is disposed in the accommodation space and is used for being guided by the accommodation space and sliding relative to the cylinder. Thereby, this drives the power generation component to convert mechanical energy into electrical energy, and to force the remaining air in the accommodation space and remaining air in the fluid to be discharged via the vent.

10 Claims, 11 Drawing Sheets

(51) Int. Cl.
*F03B 13/18* (2006.01)
*F15B 21/04* (2006.01)

(56) References Cited

U.S. PATENT DOCUMENTS

| 2010/0043424 A1 | 2/2010 | Papadopoulos |
| 2010/0212310 A1 | 8/2010 | Welch, Jr. |
| 2011/0072962 A1 | 3/2011 | Scholtes |

FOREIGN PATENT DOCUMENTS

| EP | 0269091 A2 | 6/1988 |
| JP | 2011527402 A | 10/2011 |
| TW | 148013 | 12/1990 |
| TW | 472831 | 1/2002 |
| TW | 200741098 | 11/2007 |
| TW | M325386 | 1/2008 |
| TW | 201028534 A | 8/2010 |
| TW | M388562 | 9/2010 |
| TW | M401062 | 4/2011 |
| TW | 201122215 A | 7/2011 |
| TW | M406649 U | 7/2011 |
| TW | 201126059 A | 8/2011 |
| TW | M415207 U | 11/2011 |
| TW | M425173 U | 3/2012 |
| WO | 2009146564 A1 | 12/2009 |
| WO | 2011026458 A1 | 3/2011 |
| WO | 2011065841 A1 | 6/2011 |
| WO | 2011155906 A1 | 12/2011 |

OTHER PUBLICATIONS

Antonio F. De O. Falcao, Phase control through load control of oscillating-body wave energy converters with hydraulic PTO system, ScienceDirect, Ocean Engineering, 2008, p. 358-366, vol. 35.

T. Bjarte-Larsson, J. Falnes, Laboratory experiment on heaving body with hydraulic power take-off and latching control, ScienceDirect, Ocean Engineering, 2006, p. 847-877, vol. 33.

E. Tedeschi, M. Molinas, Impact of control strategies on the rating of electric power take off for Wave Energy conversion, IEEE, 2010, p. 2406-2411.

A. F. De O. Falcao et al., Hydrodynamic simulation of a floating wave energy converter by a U-tube rig for power take-off testing, Ocean Engineering, 2010, p. 1253-1260, vol. 37.

Pasquale Filianoti et al., A linearized model for estimating the performance of submerged resonant wave energy converters, ScienceDirect, Renewable Energy, 2008, p. 631-641, vol. 33.

China Patent Office, Office Action issued on Sep. 2, 2015, China.

European Patent Office, "Office Action", Oct. 21, 2015, Germany.

WAVE POWER GENERATION SYSTEM AND HYDRAULIC COMPONENT THEREOF

CROSS-REFERENCE TO RELATED APPLICATIONS

This non-provisional application claims priority under 35 U.S.C. §119(a) on Patent Application No(s). 101140419 filed in Taiwan, R.O.C. on 2012 Oct. 31, the entire contents of which are hereby incorporated by reference.

TECHNICAL FIELD

The disclosure relates to a power system.

BACKGROUND

As the environmental awareness gains popularity, green energy is believed to be the future energy for mankind. Because green energy is being valued, people have been putting a greater effort into the development of solar power, hydroelectric and wind power. Nevertheless, regardless of the efficiency of the power generation, solar power and wind power are easily affected by the environment and the weather. For example, when there is low sunlight exposure or no sunlight, solar power is unable to convert solar energy into electricity effectively, and as for wind power, it cannot be generated when the current weather is windless. Therefore, it is required to develop a power generation system which utilizes natural power and can work 24 hours a day regardless of the limitations of the environment and the weather.

Since waves are always along the coastlines, wave energy is getting more attention from researchers and developers, because wave energy is renewable and utilizing wave energy does not harm the environment.

A wave power generation device usually includes a floating body, a hydraulic assembly and a power generation assembly. The floating body is disposed on the hydraulic assembly, while the hydraulic assembly connects to the power generation assembly. The floating body is configured for moving up and down with the fluctuations of the waves, thereby driving the hydraulic assembly to work for generating electricity by the power generation assembly. In detail, the hydraulic assembly includes a hydraulic cylinder and a piston. As the floating body moves up and down, the hydraulic cylinder is driven to move relative to the piston. As a result, the oil in the hydraulic cylinder is pushed to the power generation assembly, so as to make the power generation assembly convert mechanical energy from the waves into electricity.

However, air gets compressed, and when unexpected air remains in the hydraulic cylinder, it is repeatedly compressed during the compression process of the hydraulic assembly, which reduces the efficiency of power generation because the oil cannot be pushed to the power generation assembly by the piston smoothly. Consequently, in order to improve the power generation efficiency of the wave power generation device, it is crucial to find a solution for the remaining air in the hydraulic cylinder.

SUMMARY

A wave power generation system comprises a power generation component and a hydraulic component. The hydraulic component comprises a cylinder and a piston. The cylinder connects to the power generation component. The cylinder has an accommodation space and a vent located on the middle section of the accommodation space such that the accommodation space connects to the outside through the vent. The accommodation space is configured for accommodating a fluid. The piston is disposed in the accommodation space for being guided by the accommodation space and sliding relative to the cylinder. Thereby, this drives the power generation component to convert mechanical energy into electrical energy, and to force the remaining air in the accommodation space and remaining air in the fluid to be discharged through the vent.

BRIEF DESCRIPTION OF THE DRAWINGS

The present invention will become more fully understood from the detailed description given hereinbelow along with the accompanying drawings which are for illustration only, thus are not limitative of the present invention, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
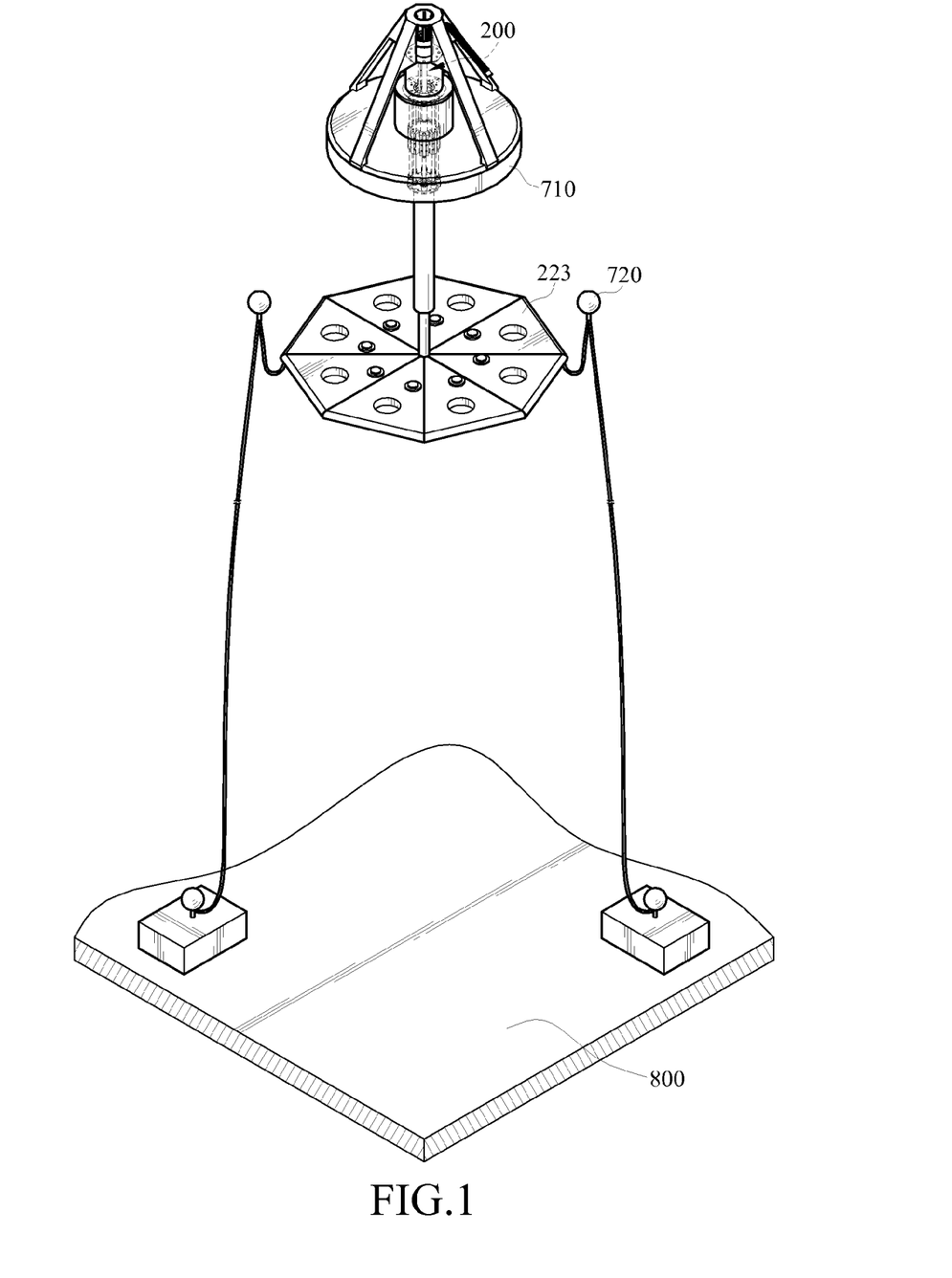
FIG. 1 is a perspective view of a wave power generation system according to an embodiment of the disclosure.

The wave power generation system 10 of this embodiment is disposed on the sea, and it utilizes kinetic energy from the waves moving up and down to generate electricity. The wave power generation system 10 comprises a power generation component 100 and a hydraulic component 200. The power generation component 100 and the hydraulic component 200 are connected with each other. Additionally, the wave power generation system 10 further comprises an upper floating body 710 and a lower floating body 720 and they are both disposed on the power generation component 100. The upper floating body 710 is configured for moving up and down with the fluctuations of the waves to drive the hydraulic component 200 to convert kinetic energy of the waves into hydraulic energy. The hydraulic energy, then, is converted into electricity by the power generation component 100.

The power generation component 100 comprises a hydraulic motor 110 and a generator 120. The generator 120 is connected to the hydraulic motor 110 which is configured for converting hydraulic energy into mechanical energy. The generator 120 is configured for converting mechanical energy into electricity.

Figure 2A:
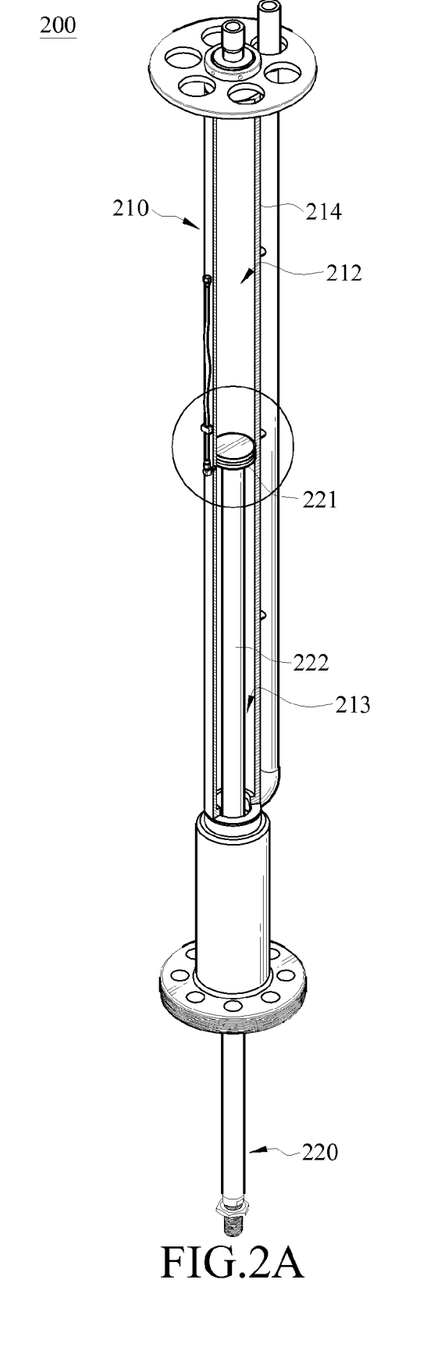
FIG. 2A is a sectional view of the hydraulic component of FIG. 1.
Figure 2B:
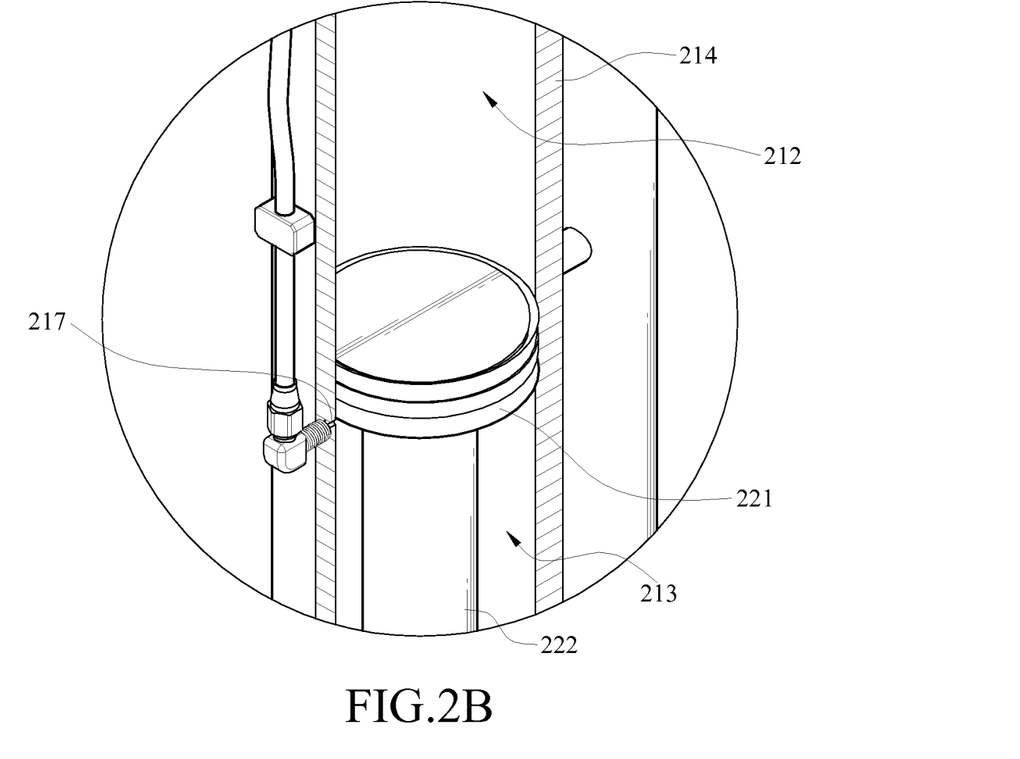
FIG. 2B is a partial sectional view of FIG. 2A.

The hydraulic component 200 comprises a cylinder 210 and a piston 220. The cylinder 210 and the hydraulic motor 110 are connected with each other. The cylinder 210 has an accommodation space 211 and an annular side wall 214 forming the accommodation space 211. The accommodation space 211 stores a fluid therein. In this embodiment, the fluid is oil. In addition, the cylinder 210 has a first opening 215, a second opening 216 and a vent 217. The first opening 215 and the second opening 216 both connect to the accommodation space 211 and the hydraulic motor 110. Moreover, the first opening 215 and the second opening 216 are located on opposite ends of the annular side wall 214, respectively. The fluid in the accommodation space 211 is configured for flowing to the hydraulic motor 110 via the first opening 215 and the second opening 216. The vent 217 runs through the annular side wall 214 so that the vent 217 connects to the accommodation space 211 and is between the first opening 215 and the second opening 216. In other words, the vent 217 runs outside from the accommodation space 211. More precisely, the vent 217 is approximately in the midsection of the accommodation space 211 and is configured for discharging the remaining air in the accommodation space 211 or the remaining air in the fluid out of the accommodation space 211. Furthermore, the cylinder 210 is erected on the upper floating body 710 so the cylinder 210 moves up and down along the upper floating body 710. Moreover, in this embodiment, the number of vents 217 is one, but it is not limited thereto. In other embodiments, the number of vents 217 may be two or more than two.

The piston 220 comprises a main body 221 and a rod 222. The main body 221 is inside the accommodation space 211 and the edge of the main body 221 contacts the annular side wall 214. Thereby, the main body 221 divides the accommodation space 211 into a first oil chamber 212 and a second oil chamber 213. Since the cylinder 210 is erected on the upper floating body 710, the first oil chamber 212 is above the second oil chamber 213. Additionally, the first oil chamber 212 connects to the first opening 215, while the second oil chamber 213 connects to the second opening 216. The rod 222 penetrates the cylinder 210 and one end of the rod 222 is connected to the main body 221. The other end of the rod 222 comprises a fixing portion 223 connected to the lower floating body 720, and the lower floating body 720 is further connected to the seabed 800 to fix the relative position of the piston 220.

In this embodiment, the cylinder 210 is erected on the upper floating body 710 and the rod 222 is connected to the seabed 800. Thus, when the upper floating body 710 is pushed by an external force (e.g. the force of waves moving up and down) to move up and down relative to the seabed 800, it drives the cylinder 210 to move relative to the piston 220. More precisely, the piston 220 is guided by the accommodation space 211 and moves relative to the cylinder 210 in order to push the fluid from the accommodation space 211 to the hydraulic motor 110. Thereby, the hydraulic motor 110 is driven to start the generator 120 for generating electricity.

As seen in FIG. 4A to FIG. 4D, since a perfect liquid-tight and airtight performance is not possible regarding the hydraulic component 200, unexpected air may enter the accommodation space 211 when the hydraulic component 200 is operating. Furthermore, air has compressibility so it may reduce the working efficiency of the hydraulic component 200. In this embodiment, in order to solve the problem that air in the hydraulic component 200 reduces the working efficiency thereof, the vent 217 is disposed in the middle section of the annular side wall 214 so the air in the accommodation space 211 can be discharged by the vent 217. In this embodiment, since the first opening 215 is above the first oil chamber 212, air in the first oil chamber 212 can be discharged naturally by the first opening without affecting the process of the piston 220 pushing the fluid during the compression processes of the hydraulic component 200. The second opening 216, on the other hand, is below the second oil chamber 213, so air in the second oil chamber 213 is unable to be discharged, thereby reducing the compression efficiency of the hydraulic component 200. Thus, in this embodiment, the vent 217 is disposed on the middle section of the accommodation space 211, so that the hydraulic component 200 discharges air in the second oil chamber 213 via the vent 217 naturally during the compression process. That is, when the piston pushes the fluid and air to the vent 217, air and a part of the fluid can both be discharged outside from the accommodation space 211.

Figure 4A:
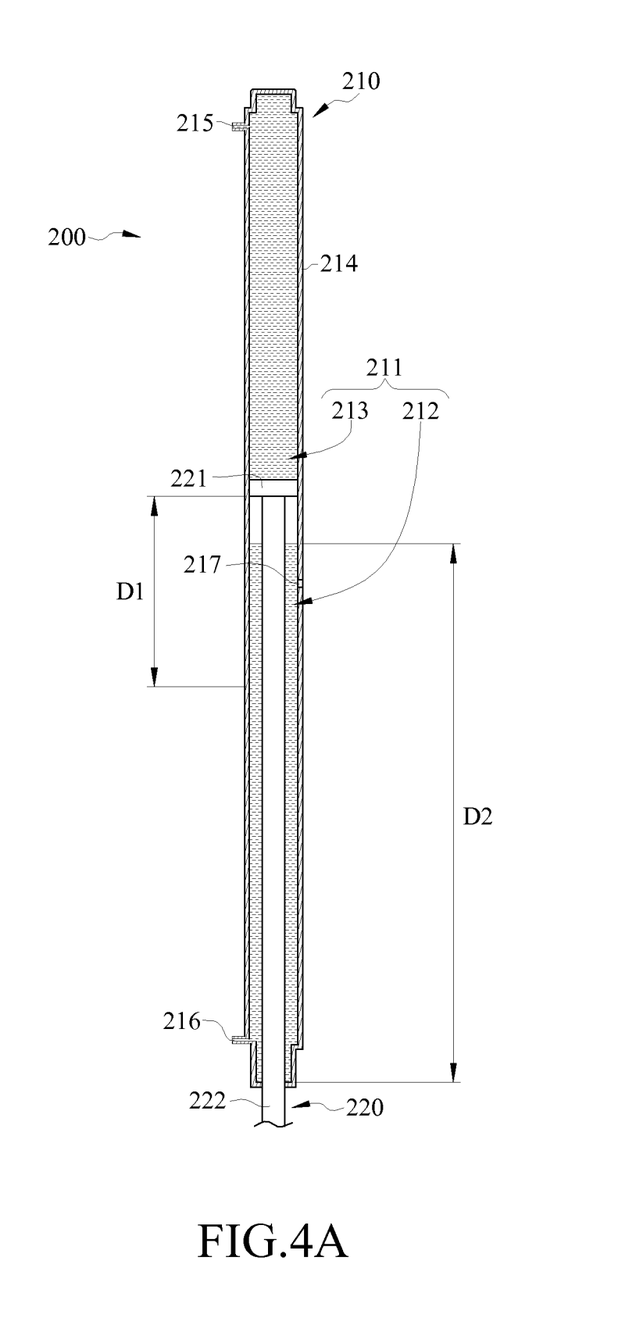
FIG. 4A and FIG. 4B are cross-sectional views of the fluid in the hydraulic component before the air has been exhausted.
Figure 4B:
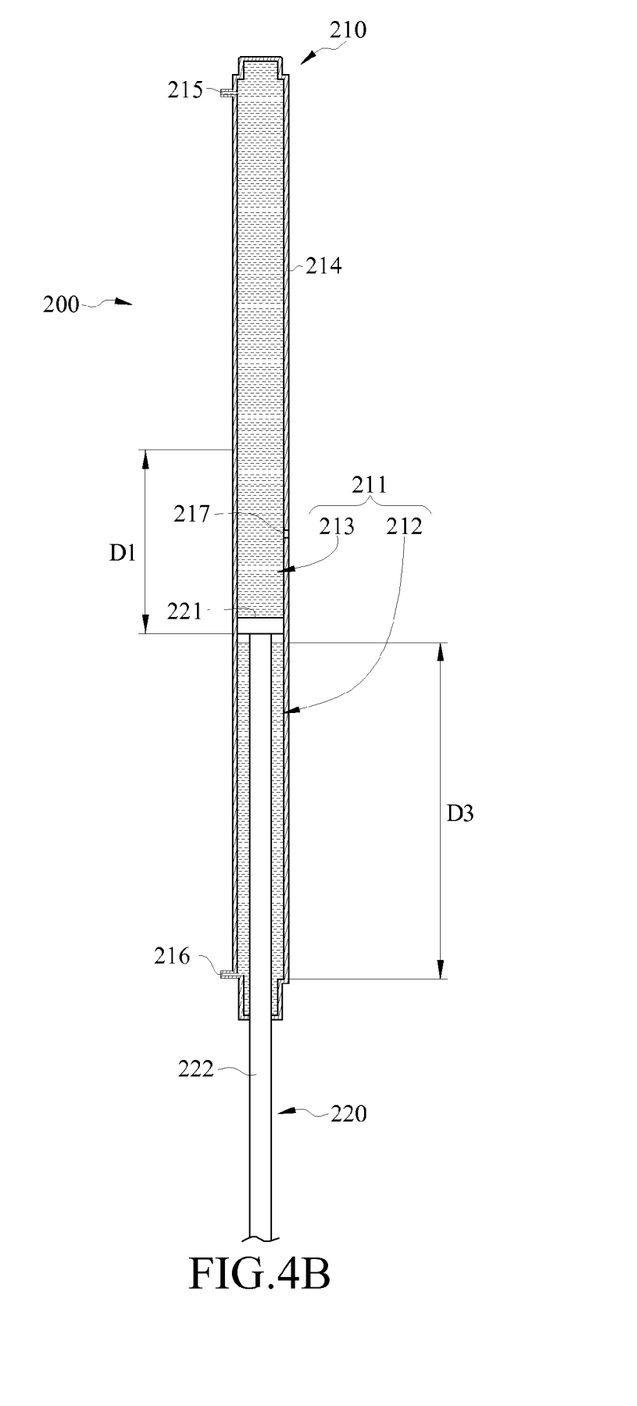

The following describes the operation of the hydraulic component 200, before and after exhaust. The operation condition before exhaust will be illustrated first. As seen in FIG. 4A and FIG. 4B, the piston 220 moves downward to push the fluid in the second oil chamber 213 to the hydraulic motor 110 via the second opening 216 (namely, moving from the position of FIG. 4A to the position of FIG. 4B). Since the second oil chamber 213 has air therein, there is less fluid being discharged than expected. In this embodiment, the original height of the fluid in the second oil chamber 213 is D2. When the piston moves downward by a distance D1, a part of the fluid is discharged from the second oil chamber 213 such that the height of the fluid in the second oil chamber 213 drops to D3. Since air is compressed, the actual decreased height (D2 minus D3) is less than the distance of the piston 220 moving downward, which reduces the efficiency of the piston 220 pushing the fluid.

Figure 4C:
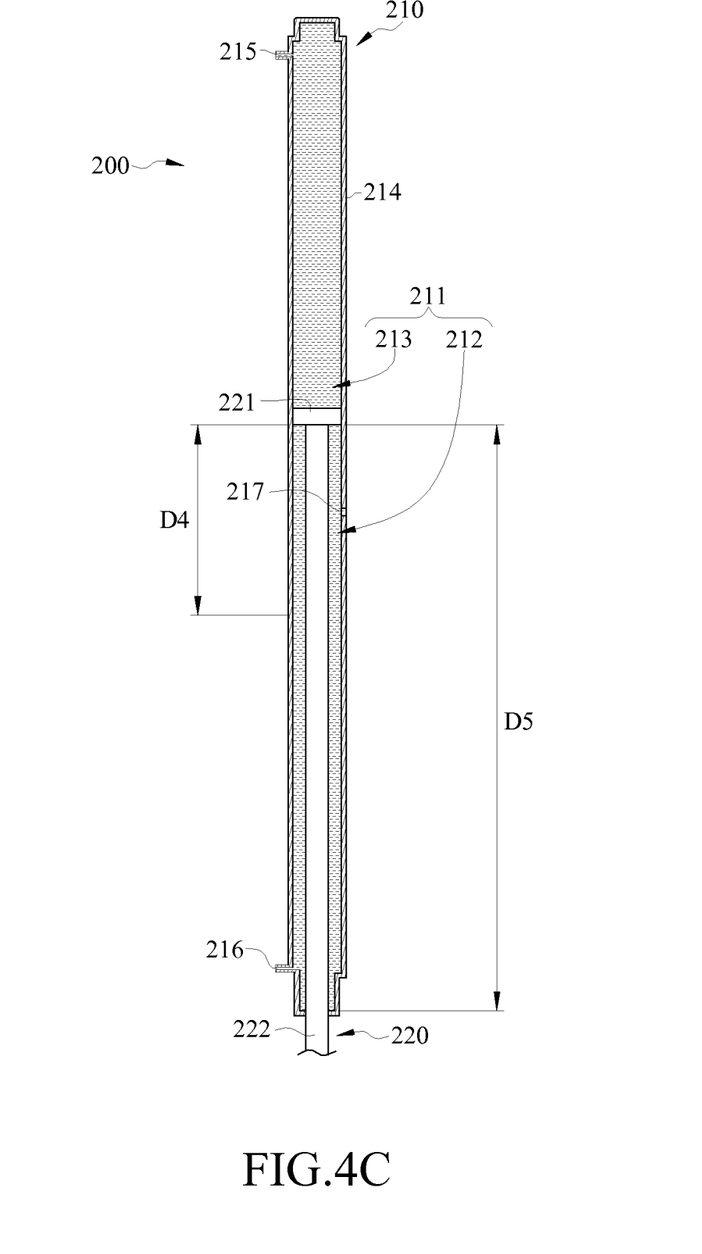
FIG. 4C and FIG. 4D are cross-sectional views of the fluid in the hydraulic component after the air has been exhausted.
Figure 4D:
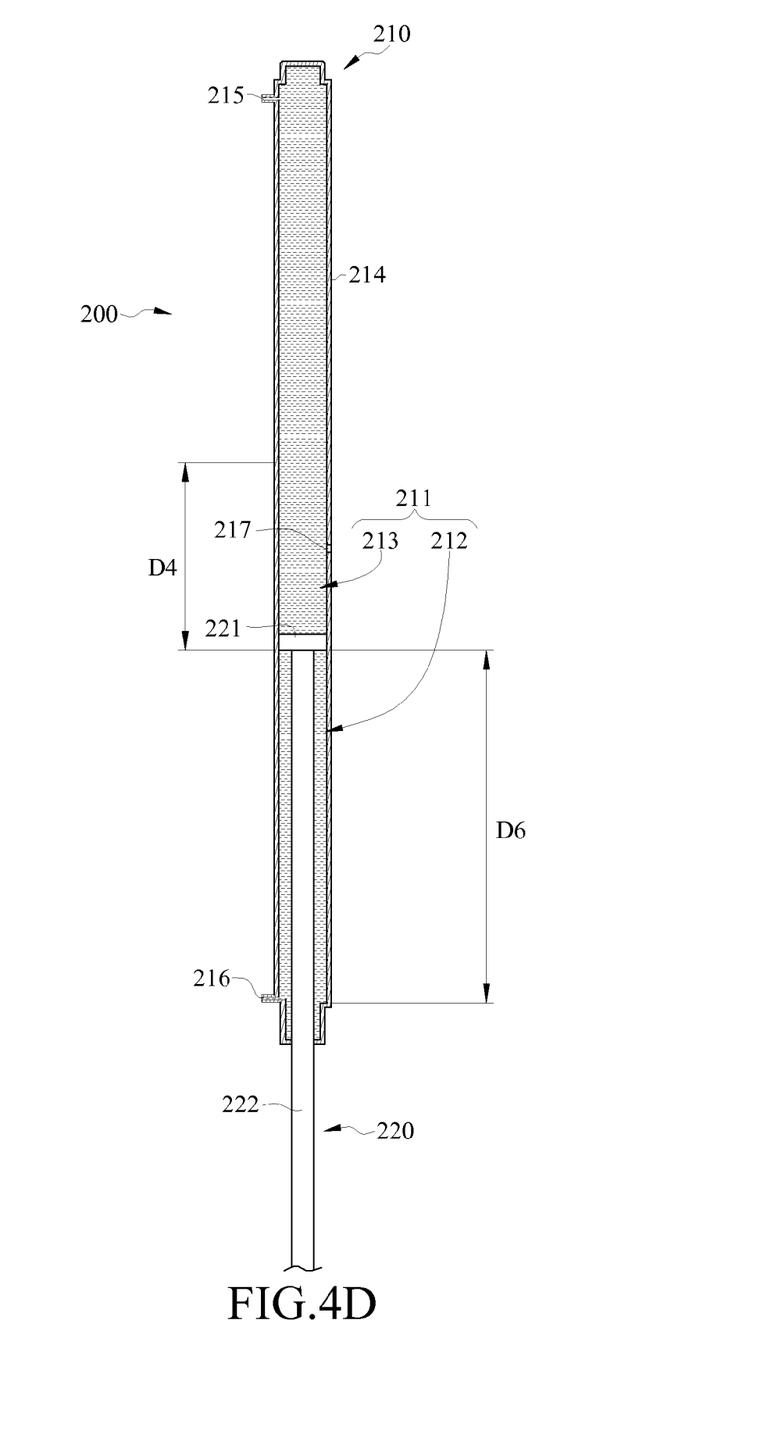

Next, the operation of the hydraulic component 200 after exhaust will be illustrated. As seen in FIG. 4C and FIG. 4D, the piston 220 moves downward to push the fluid in the second oil chamber 213 to the hydraulic motor 110 via the second opening 216 (namely, moving from the position of FIG. 4C to the position of FIG. 4D). Since there is no air in the second oil chamber 213, the transferring efficiency of the fluid by the piston 220 is not affected. Precisely, the original height of the fluid in the second oil chamber 213 is D5. Then, when the piston 220 moves downward by a distance D4, some of the fluid is discharged from the second oil chamber 213, so that the height of the fluid in the second oil chamber 213 drops to D6. Since the compression process of the piston 220 is not affected by air, the actual decreasing height of the fluid (namely D5 minus D6) is substantially equal to the distance D4 which refers to the distance that the piston 220 moves downward. Thereby, the transferring efficiency of the fluid pushed by the piston 220 is improved.

Figure 3:
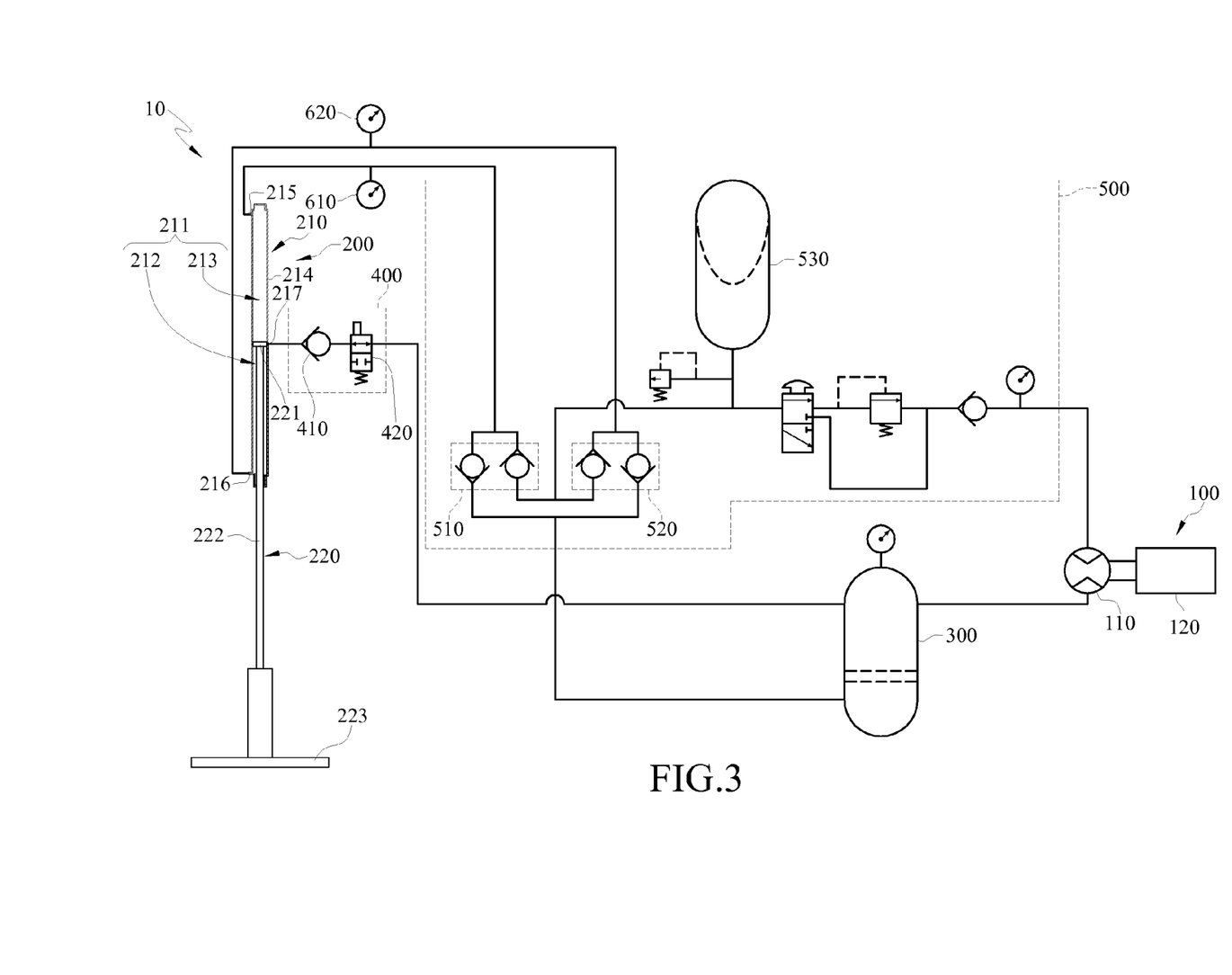
FIG. 3 is a diagram of the system loop of the wave power generation system.

As seen in FIG. 3, in the compression process of the hydraulic component 200, not only air is discharged via the vent 217, the fluid in the accommodation space 211 is also leaked, thereby reducing the compression efficiency of the hydraulic component 200. Consequently, in this and some other embodiments, the wave power generation system 10 further comprises an exhaust valve assembly 400 and an oil storage tank 300. The exhaust valve assembly 400 comprises a check valve 410 (also called a one-way valve) and an off valve 420. The check valve 410 and the off valve 420 are connected in series. The check valve 410 and the vent 217 are connected to each other while the off valve 420 and the oil storage tank 300 are connected to each other. The foregoing connecting relationship regarding the check valve 410 and the off valve 420, however, is not intended to limit the disclosure. That is, in other embodiments, the check valve 410 may be connected to the oil storage tank 300, while the off valve 420 may be connected to the vent 217. The check valve 410 is configured for controlling the fluid and the air to flow along the direction towards the oil storage tank 300 via the vent 217. The off valve 420 is configured for connecting or blocking the vent 217 to the oil storage tank 300. That is, when a certain amount of air is accumulated in the accommodation space 211 which affects the compression efficiency of the hydraulic component 200, the off valve 420 can be turned on to discharge the air in the oil chamber 213. When there is not enough air in the accommodation space 211 to affect the compression efficiency of the hydraulic component 200, the off valve 420 can be turned off. This can prevent the leakage of the fluid in the accommodation space from influencing the compression efficiency of the hydraulic component 200.

In this and some other embodiments, the wave power generation system 10 further comprises a control valve assembly 500. The control valve assembly 500 comprises a first check valve assembly 510, a second check valve assembly 520 and an accumulator 530. The first check valve assembly 510 connects to the first opening 215, the hydraulic motor 110 and the oil storage tank 300. The second check valve assembly 520 connects to the second opening 216, the hydraulic motor 110 and the oil storage tank 300. The first check valve assembly 510 and the second check valve assembly 520 are both used for controlling the fluid to flow to the oil storage tank 300 via the first opening 215 or the second opening 216. As a result, the hydraulic motor 110 is pushed by the fluid and therefore rotates accordingly. The accumulator 530 is used to maintain the fluid flowing out of the first opening 215 and the second opening 216 at high pressure.

Figure 5A:
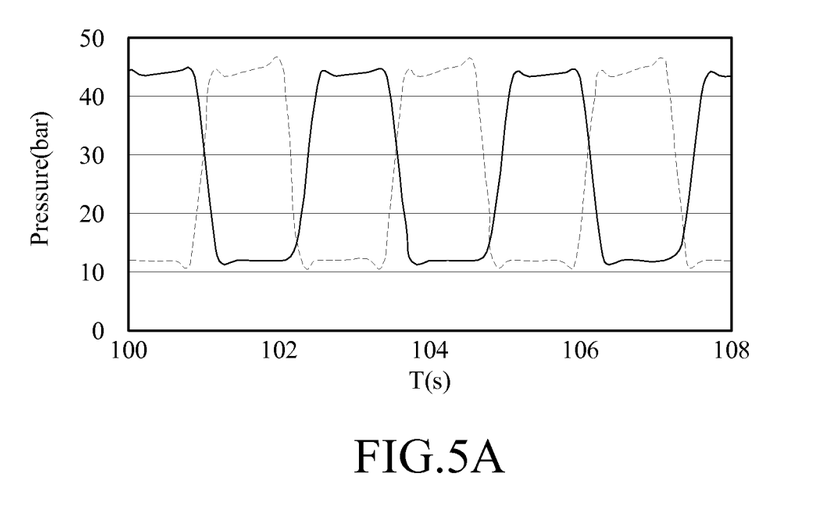
FIG. 5A and FIG. 5B are line graphs regarding the pressure changes of the first manometer and the second manometer of FIG. 3.
Figure 5B:
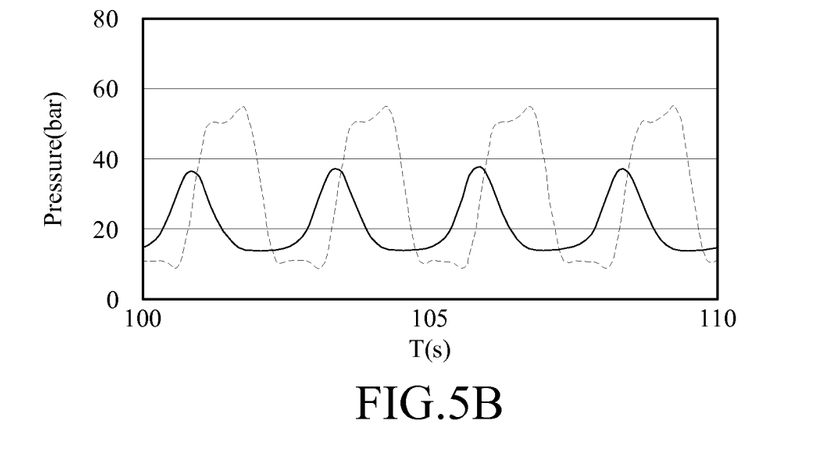

As seen in FIG. 3, FIG. 5A and FIG. 5B, in this and some other embodiments, the wave power generation system 10 further comprises a first manometer (also named a pressure senor) 610 and a second manometer 620. The first manometer 610 is connected with a pipeline that is connected to the first opening 215 for detecting the pressure of the pipeline connected to the first opening 215. The second manometer 620 is connected with a pipeline connected to the second opening 216 for detecting the pressure of the pipeline connected to the second opening 216. Thus, the user may know whether the air starts affecting the compression of the hydraulic component 200 based on the value of the pressures detected by the first manometer 610 and the second manometer 620.

The value of the pressure detected by the first manometer 610 and the second manometer 620 is shown in FIG. 5A and FIG. 5B. In FIG. 5A, the maximum pressure value of the first manometer 610 (in dotted line) substantially equals the maximum pressure value of the second manometer 620 (in solid line). This indicates that there is no air in the second oil chamber 213 or there is not enough air to affect the compression efficiency of the hydraulic component 200.

By comparison, in FIG. 5B, the maximum pressure value of the first manometer 610 (the dotted line) is much less than the maximum pressure value of the second manometer 620 (the solid line). This indicates that there is enough air in the second oil chamber to have an impact on the compression efficiency of the hydraulic component 200. Therefore, when users find that the maximum pressure value of the first manometer 610 is not equal to the maximum pressure value of the second manometer 620, they can turn on the off valve 420 of the exhaust valve 400. Thereby, the air in the second oil chamber 213 can be discharged into the oil storage chamber via the vent 217.

Figure 6A:
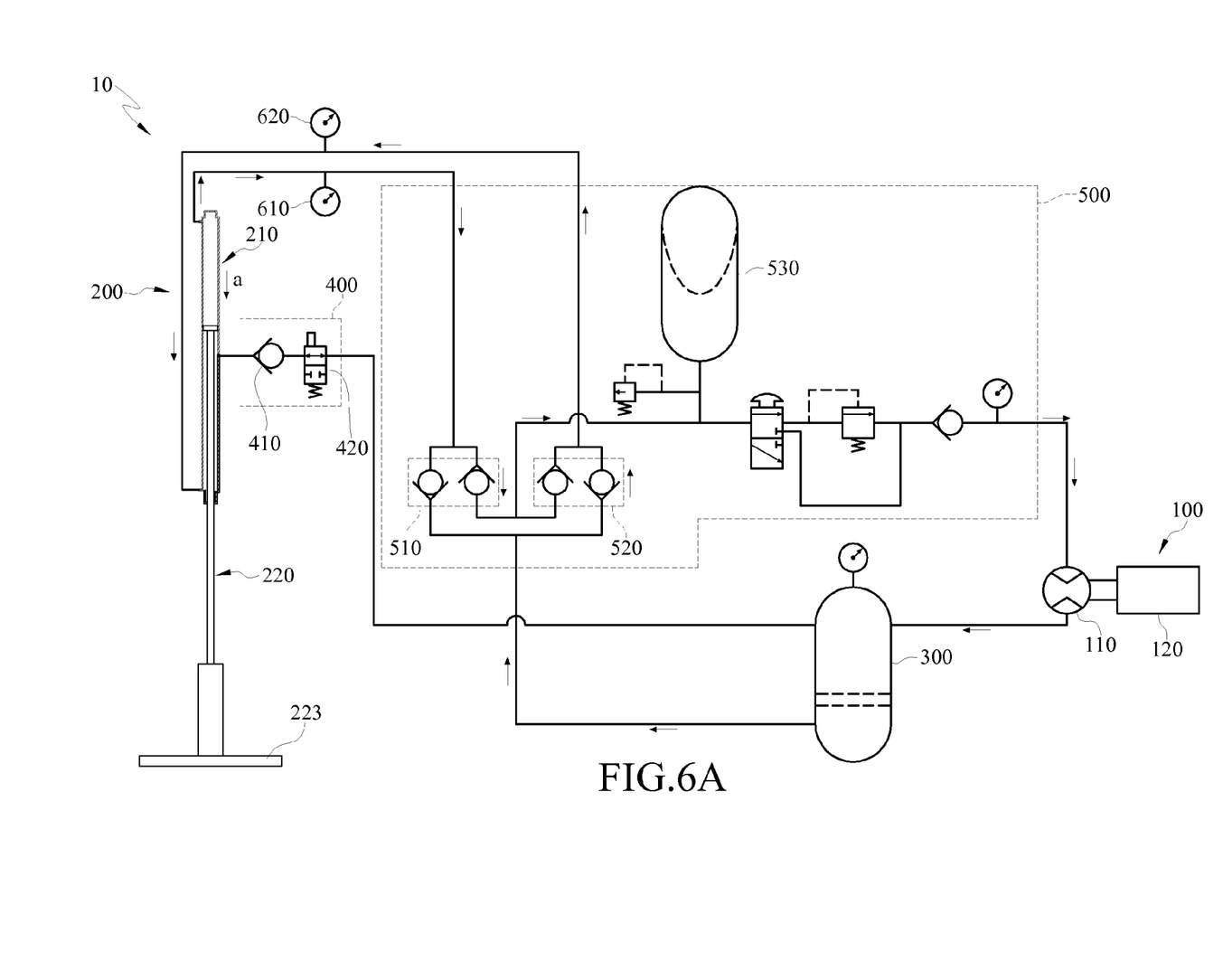
FIG. 6A and FIG. 6B are diagrams of the operation of the wave power generation system.
Figure 6B:
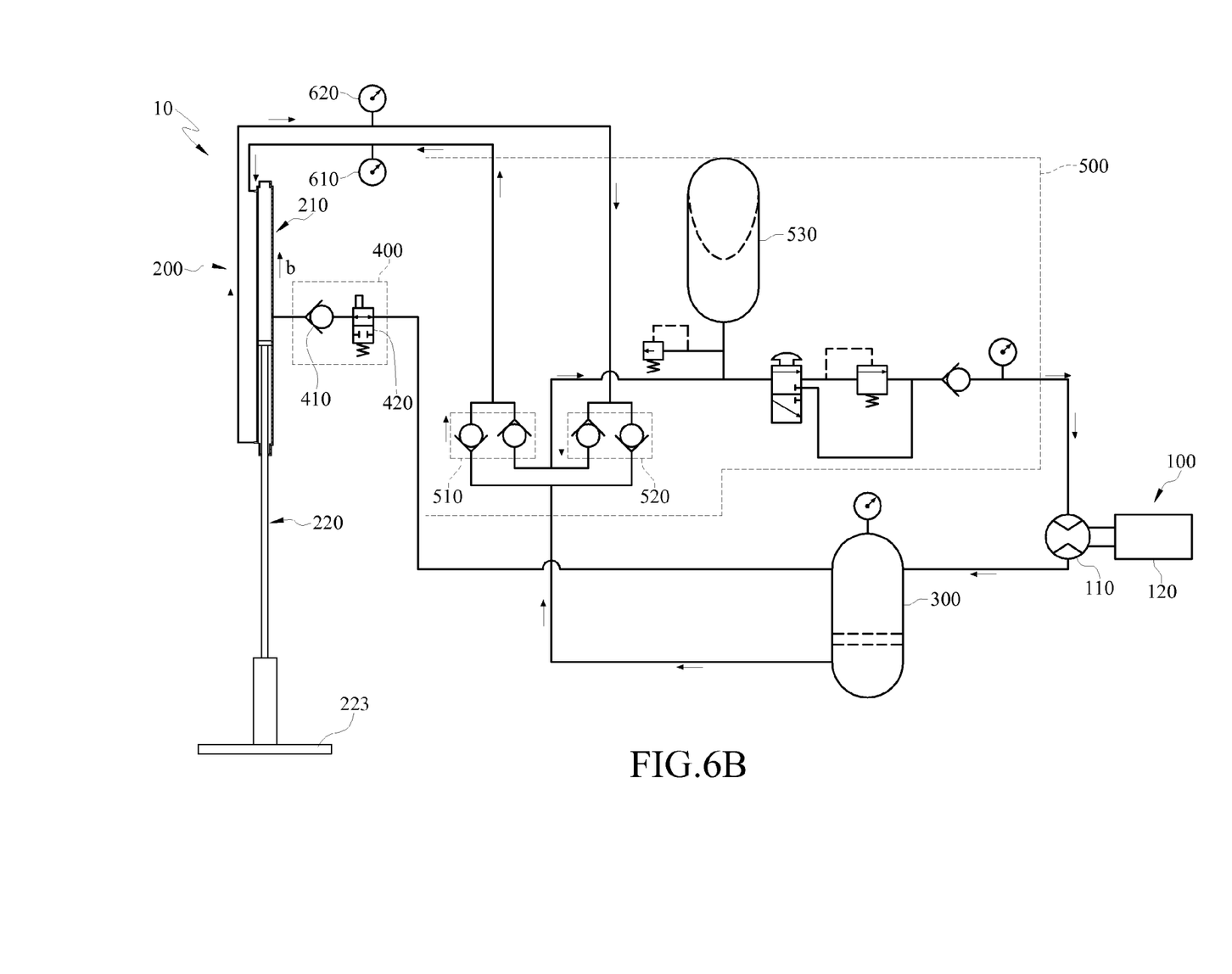

FIG. 6A and FIG. 6B are schematic views of the operation of the wave power generation system 10. As seen in FIG. 6A, when the cylinder 210 is pushed to move downward, along the direction of arrow a, by the upper floating body 710 (not shown in FIG. 6A), the piston 220 pushes the fluid from the second oil chamber 213 to the hydraulic motor 110, via the second opening 216 and the second check valve 520 of the control valve assembly 500 in sequence (namely, in the order indicated by the arrows). The hydraulic motor 110 drives the generator 120 to convert mechanical energy into electricity. Subsequently, from the oil storage tank 300 and the first check valve assembly 510, the fluid flows back to the first oil chamber 212 to from a circle (in the order indicated by the arrows). As seen in FIG. 6B, when the cylinder 210 is pushed by the upper floating body 710 to move upward (along the direction of arrow b), the piston 220 pushes the fluid in the second oil chamber 213 to the hydraulic motor 110, via the first opening 215 and the second check valve 520 of the control valve assembly 500 in sequence (namely, in the order indicated by the arrows). The hydraulic motor 110 drives the generator 120 to convert mechanical energy into electricity. Then, from the oil storage tank 300 and the second check valve assembly 520, the fluid flows back to the second oil chamber 213 to from a circle (in the order indicated by the arrows).

In the wave power generation system and the hydraulic component thereof according to the disclosure, the annular side wall of the cylinder has a vent. The vent is located in the middle section of the annular sidewall and connects to the exhaust valve assembly. Hence, when there is enough air accumulated in the second oil chamber to influence the compression efficiency of the hydraulic component, the off valve of the exhaust valve assembly can be opened to let the air in the second oil chamber out. Thereby, the compression efficiency of the hydraulic component is improved such that the power generation efficiency of the wave power generation system is improved accordingly.

Furthermore, disposing a check valve in the exhaust valve assembly can prevent the air discharged by the vent from flowing back, thereby improving the exhaust efficiency.

What is claimed is:

1. A wave power generation system disposed on the sea comprising:
   a power generation component;
   an upper floating body;
   a lower floating body; and
   a hydraulic component comprising:
      a cylinder communicating with the power generation component, wherein the cylinder has an accommodation space and a vent located on a middle section of the accommodation space such that the vent runs outside from the accommodation space, and the accommodation space is configured for accommodating a fluid; and
      a piston disposed in the accommodation space and configured for being guided by the accommodation space and sliding relative to the cylinder, so as to drive the power generation component to convert mechanical energy into electrical energy, and to force the remaining air in the accommodation space and the remaining air in the fluid to be discharged via the vent;
      wherein the cylinder further comprises an annular side wall forming the accommodation space, the cylinder has a first opening and a second opening, the accommodation space and the power generation component are connected to each other via the first opening and the second opening, the first opening and the second opening are located on opposite ends of the annular side wall, respectively, and the vent is located in the annular side wall and between the first opening and the second opening.

2. The wave power generation system according to claim 1, wherein the power generation component comprises a hydraulic motor and a generator, the hydraulic motor connects to both the first opening and the second opening, and the generator is connected to the hydraulic motor.

3. The wave power generation system according to claim 2, further comprising an exhaust valve assembly and an oil storage tank, wherein the exhaust valve assembly comprises a check valve connecting to the vent and an off valve connecting to the oil storage tank.

4. The wave power generation system according to claim 3, further comprising a control valve assembly, wherein the control valve assembly comprises a first check valve assembly and a second check valve assembly, the first check valve assembly connects to the first opening, the hydraulic motor and the oil storage tank, while the second check valve assembly connects to the second opening, the hydraulic motor and the oil storage tank.

5. The wave power generation system according to claim 1, wherein the piston comprises a fixing portion connected to the lower floating body, the cylinder is erected on the upper floating body to be configured for being pushed by an external force to move along a vertical direction, thereby making the cylinder move relative to the piston.

6. The wave power generation system according to claim 1, wherein the piston comprises a main body and a rod, the main body is located in the accommodation space to divide the accommodation space into a first oil chamber and a second oil chamber, the first oil chamber connects to the first opening, the second oil chamber connects to the second opening, and the rod is connected to the main body and penetrates the cylinder.

7. The wave power generation system according to claim 1, further comprising a first manometer and a second manometer, the first manometer is connected with a pipeline connected to the first opening, and the second manometer is connected with a pipeline connected to the second opening.

8. A hydraulic component disposed on the sea comprising:
an upper floating body;
a lower floating body;
a cylinder communicating with a power generation component, wherein the cylinder has an accommodation space and a vent, the vent is located on a middle section of the accommodation space and connects to the accommodation space, and the accommodation space connects to the power generation component; and
a piston disposed in the accommodation space, the piston being configured for driving the power generation component to convert mechanical energy into electrical energy;
wherein the cylinder comprises an annular side wall forming the accommodation space, the cylinder has a first opening and a second opening, both the first opening and the second opening connect to the accommodation space and the power generation component, and the first opening and the second opening are located on opposite ends of the annular side wall respectively, and the vent is located in the annular side wall and is between the first opening and the second opening.

9. The hydraulic component according to claim 8, wherein the piston comprises a fixing portion connected to the lower floating body, the cylinder is erected on the upper floating body, the upper floating body is pushed by an external force so that the upper floating body is configured for vertical movement, thereby making the cylinder move relative to the piston.

10. The hydraulic component according to claim 8, wherein the piston comprises a main body and a rod, the main body is located in the accommodation space and divides the accommodation space into a first oil chamber and a second oil chamber, the first oil chamber connects to the first opening, the second oil chamber connects to the second opening, the rod is connected to the main body and penetrates the cylinder.

* * * * *